(12) United States Patent
Hall et al.

(10) Patent No.: US 10,960,874 B2
(45) Date of Patent: Mar. 30, 2021

(54) SYSTEM FOR AUTOMATICALLY ADJUSTING DRIVE MODES

(71) Applicant: Hall Labs LLC, Provo, UT (US)

(72) Inventors: David R. Hall, Provo, UT (US); Michael Hall, Provo, UT (US); Seth Myer, Eagle Mountain, UT (US)

(73) Assignee: Hall Labs LLC, Provo, UT (US)

( * ) Notice: Subject to any disclaimer, the term of this patent is extended or adjusted under 35 U.S.C. 154(b) by 175 days.

(21) Appl. No.: 16/196,148

(22) Filed: Nov. 20, 2018

(65) Prior Publication Data

US 2019/0152468 A1 May 23, 2019

Related U.S. Application Data

(60) Provisional application No. 62/591,309, filed on Nov. 28, 2017, provisional application No. 62/588,573, filed on Nov. 20, 2017.

(51) Int. Cl.
*B60W 20/16* (2016.01)
*B60W 50/08* (2020.01)
(Continued)

(52) U.S. Cl.
CPC ............ *B60W 20/16* (2016.01); *B60W 10/06* (2013.01); *B60W 10/08* (2013.01); *B60W 10/18* (2013.01); *B60W 50/082* (2013.01); *G07C 5/008* (2013.01); *B60K 6/20* (2013.01); *B60W 2050/0079* (2013.01); *B60W 2400/00* (2013.01); *B60W 2530/10* (2013.01); *B60W 2710/0627* (2013.01); *B60W 2710/08* (2013.01); *B60W 2710/18* (2013.01); *B60Y 2200/147* (2013.01); *B60Y 2200/92* (2013.01); *B60Y 2300/182* (2013.01)

(58) Field of Classification Search
CPC .... B60W 20/16; B60W 50/082; B60W 10/06; B60W 10/08; B60W 10/18; B60W 2710/0627; B60W 2710/08; B60W 2710/18; B60W 2050/0079; B60W 2530/10; B60W 2400/00; B60W 2050/0075; B60W 2050/0077; B60W 2050/146; B60W 2530/207; B60W 30/182; G07C 5/008; B60Y 2300/182; B60Y 2200/92; B60Y 2200/147; B60K 6/20
USPC ......................................................... 701/22
See application file for complete search history.

(56) References Cited

U.S. PATENT DOCUMENTS 6,459,367 B1 * 10/2002 Green ..................... G08G 1/052
177/1
7,155,334 B1 * 12/2006 Stewart .................. F02D 35/023
701/114

(Continued)

*Primary Examiner* — Jonathan M Dager
*Assistant Examiner* — Jean W Charleston

(57) ABSTRACT

The invention is a system for automatically adjusting drive modes based on weight. The system includes a weight determination system, a data input device configured to receive input data, and a processing device. The processing devices includes a processor and non-volatile memory. The processor is configured to receive weight data from the weight determination system, receive the input data from the data input device, and receive a user input. The processor is also configured to determine at least one drive mode setting based on the weight data, the input data and the user input, send the drive mode setting data to a vehicle control system, and communicate the drive mode setting to a user.

19 Claims, 4 Drawing Sheets

(51) Int. Cl.
*B60W 10/06* (2006.01)
*B60W 10/08* (2006.01)
*B60W 10/18* (2012.01)
*G07C 5/00* (2006.01)
*B60W 50/00* (2006.01)
*B60K 6/20* (2007.10)

(56) References Cited

U.S. PATENT DOCUMENTS

| | | | |
|---|---|---|---|
| 9,870,653 B1* | 1/2018 | Fritz | B60D 1/62 |
| 2012/0207620 A1* | 8/2012 | Dalum | B60L 55/00 |
| | | | 417/44.1 |
| 2013/0253814 A1* | 9/2013 | Wirthlin | G01L 11/025 |
| | | | 701/124 |
| 2015/0298706 A1* | 10/2015 | Hall | G01G 19/14 |
| | | | 701/37 |
| 2018/0178797 A1* | 6/2018 | Seaman | G06Q 10/083 |
| 2019/0061817 A1* | 2/2019 | Mattern | B62D 13/06 |

* cited by examiner

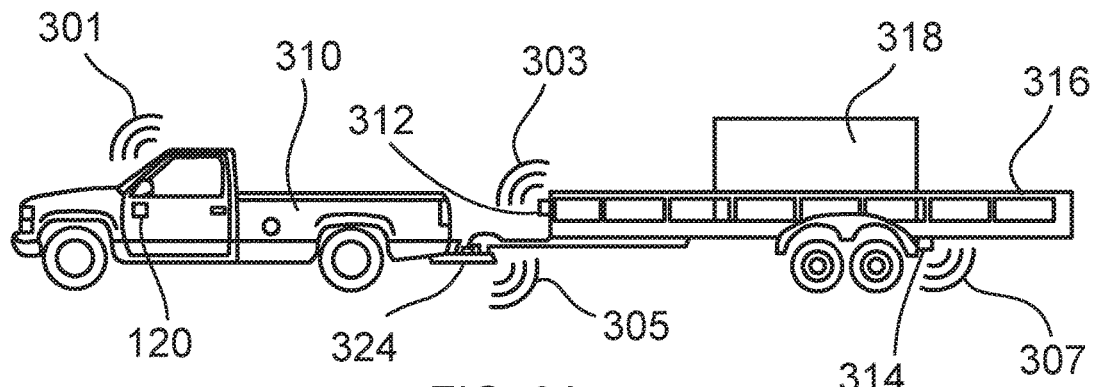
FIG. 3A
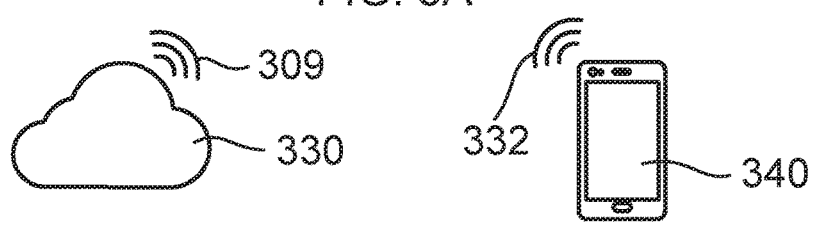
FIG. 3B
FIG. 3C
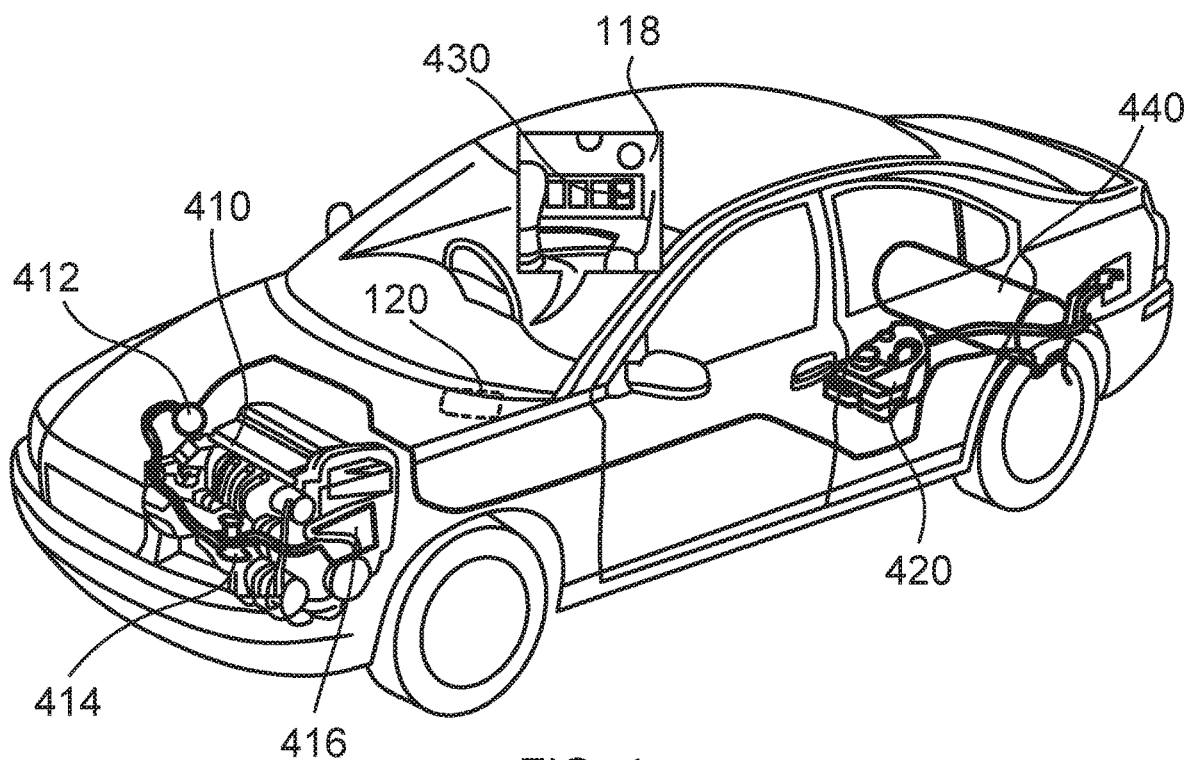
FIG. 4

SYSTEM FOR AUTOMATICALLY ADJUSTING DRIVE MODES

CROSS-REFERENCE TO RELATED APPLICATIONS

The present application is a continuation-in-part of U.S. Provisional Application No. 62/588,573, filed Nov. 20, 2017, entitled "Automatically Adjusting Vehicle Drive Modes based on Weight (AAVDM)", and a continuation-in-part of U.S. Provisional Application No. 62/591,309, filed Nov. 28, 2017, entitled "Automatically Adjusting Vehicle Emissions Control (AAVEC)". The entire disclosures of these prior applications are incorporated by reference.

TECHNICAL FIELD

This invention generally relates to automatically adjusting drive modes and emissions control within vehicle control systems.

BACKGROUND

Many factors affect the safety and stability of a vehicle under various driving conditions. Because of these differences, many vehicle manufacturers offer different "drive modes" or "driving modes" that may be selected by a driver at the beginning of a trip. Drive modes allow a vehicle to have multiple characteristics in the way that it drives, rides and handles as opposed to a single set of characteristics. Normally, a vehicle with multiple drive modes allows the driver to manually select the drive mode based on the driver's preferences.

For example, an "economy" drive mode may adjust the fuel delivery system, air-fuel ratios and acceleration rate of a vehicle to reduce the amount of fuel required and thereby conserving energy. This economy setting may not be desirable if the driver needs maximum performance while driving more aggressively which requires more power. A "performance" drive mode may allow for this type of driving. Typically, there is a method of selecting the desired drive mode by the driver.

In cases where the vehicle is a tow vehicle towing a trailer, there may be a "tow/haul" button that changes a vehicle's transmission shift patterns. Pulling a heavy load requires more power. The tow/haul mode may reduce shift cycles and may also boost torque and engage an engine braking mode to help drivers maintain control while driving up and down hills.

Current limitations exist to how effective drive mode settings may be for a specific vehicle in various scenarios. For example, the tow/haul setting may make adjustments based on a factory preset load. However, the load may be higher or much lower than the factory preset. Even if a driver has the ability to determine the weight of the vehicle and the trailer along with the weight of all loads in the bed and in the trailer, there may be no way to communicate this information to the vehicle control system in order to modify or adjust the drive mode settings.

Without a method of determining the weights of the loads along with how these weights impact the drive modes, it is difficult for the user or driver to confirm that a given drive mode is safe for a specific set-up. Therefore, a method is needed to determine the vehicle and trailer weights, communicate the weight information to the vehicle control system, and adjust the drive mode based on the weight.

SUMMARY

In one aspect, the invention is a system for automatically adjusting drive modes based on weight. The system includes a weight determination system, a data input device configured to receive input data, and a processing device. The processing devices includes a processor and non-volatile memory. The processor is configured to receive weight data from the weight determination system, receive the input data from the data input device, and receive a user input. The processor is also configured to determine at least one drive mode setting based on the weight data, the input data and the user input, send the drive mode setting data to a vehicle control system, and communicate the drive mode setting to a user.

In a preferred embodiment, the system may automatically set drive modes or adjust user selected drive modes based on weight. The system may enable automatic adjustments to a vehicle's drive modes or other operational systems within a vehicle and associated equipment to be made based on the weight of the vehicle including trailer weight if applicable. The system may inform the control systems that control the operation of the vehicle regarding weight so that adjustments to driving characteristics including performance and energy use may be made. The system may further enable automatic adjustments to a vehicle's emissions control settings or other vehicle systems that impact emissions within a vehicle to be made based on the weight. The system may further build a model of these adjusted drive modes of the tow vehicle and the trailer if applicable.

Consistent with the foregoing, a system for automatically adjusting drive modes based on weight is disclosed. The objectives of the system are to enable automatic adjustments to a vehicle's drive modes or other operational systems within a vehicle and associated equipment to be made based on the weight of the vehicle including trailer weight if applicable. The system informs the control systems that control the operation of the vehicle regarding weight so that adjustments to driving characteristics including performance and energy use may be made. The system may further enable automatic adjustments to a vehicle's emissions control settings or other vehicle systems that impact emissions within a vehicle to be made based on the weight. Additional objectives include the ability of the system to build a model of the tow vehicle and the trailer.

In a preferred embodiment, a system for automatically adjusting drive modes based on weight may include a weight determination system, a data input device configured to receive input data along with a processing device comprising a processor and non-volatile memory. The processor may be configured to receive weight data from the weight determination system, receive the input data from the data input device and receive a user input. The system may then determine at least one drive mode setting based on the weight data, the input data and the user input. The drive mode setting data may then be sent to a vehicle control system and communicate the drive mode setting to a user. In some cases, the user may select a drive mode via a user input device. The system may then modify the user selected drive mode setting based on the weight.

In an embodiment, the weight data may include vehicle weight. In another embodiment, the weight data may also include trailer weight. In a certain embodiment, the system may also include one or more sensors that may produce sensor data. The sensors may convert sensor data to an electrical signal and may include at least one sensor type of: electromagnetic; electrochemical; electric current; electric potential; magnetic; radio; air flow; accelerometers; pressure; electro-acoustic; electro-optical; photoelectric; electrostatic; thermoelectric; radio-acoustic; environmental; moisture; humidity; fluid velocity; position; angle; displacement; or combinations thereof.

In another embodiment the input data may include emissions data. The system may send a command to the vehicle control system to adjust engine settings related to emissions. The system may also send at least one command to the vehicle control system to adjust vehicle exhaust and emissions systems.

In a certain embodiment, the system may send a command to the vehicle control system to adjust fuel delivery settings. In the case of an electric or hybrid vehicle, the system may send at least one control command to a hybrid or electric vehicle power management system controlling the flow of energy to an electric motor and, in the case of a hybrid vehicle, power to an internal combustion engine.

In other embodiments, the system may send a control command to a vehicle braking system, controlling braking force delivered to brakes. In an embodiment, the input device may be an OBD device connected by a plug-in connector to a vehicle OBD port. In another embodiment, the system may send a control command to a vehicle computer server.

In an embodiment, the input device may receive and transmit data via a wireless interface. The wireless interface may utilize a protocol of a Bluetooth, Bluetooth mesh, WIFI, NFC, RFID, BLE, ZigBee, Z-wave, LoRaWAN, Dash7, DigiMesh, ANT, ANT+, NB-IoT, 3G, 4G, 5G, LTE or combinations thereof.

In a certain embodiment, the processor is configured to build a model of a set-up for a specific vehicle connected to a specific trailer. The model may determine a drive mode based on the data associated with the set-up for the model. The model may be stored in the non-volatile memory, and the system may communicate the drive mode for the model to the vehicle control system. The system may then alert the user to the drive mode for the model. The non-volatile memory may stores factory settings and user settings specific to the model.

In an embodiment, the system may also include a cloud-based network. Factory settings, the user settings and the sensor data may be stored in the memory of the cloud-based network. The cloud-based network processor may also be configured to determine set-up specific drive mode settings for a specific towing set-up of tow vehicle, trailer and all associated tow equipment, and may transmit the set-up specific drive mode settings to the system based on the sensor data, the factory settings, and the user settings.

In certain embodiments, the data input device may include a cell phone, satellite phone, smartphone, personal digital assistant, tablet computer, laptop computer, remote control device, mobile transmitter, a mobile internet device or a combination of one or more of the same.

In one embodiment, the system may also monitor, via the sensors, behavior of a vehicle and its components while driving on a specific trip. The system may then make adjustments to the drive mode and the model for the specific trip based on the specific trip sensor data and input data. This data may then be stored in the non-volatile memory. An adjusted drive mode model may then be determined based on the adjustments. This adjusted model may then be used for the specific trip and stored in the memory for use on future trips. In one example, a user may start a new trip in the future and the system may receive input data indicating a new set-up for this new trip. The system may determine that this new set-up matches or is similar to one of these stored adjusted drive mode models. In this example, the stored adjusted drive mode model may be determined to be the best for this new set-up.

In some cases, the driver may select a drive mode that may be unsafe while hauling heavy loads. For example, a truck may be pulling a trailer and the driver may select a "performance" drive mode thinking that more power is needed. However, this may not be as appropriate as a "tow/haul" drive mode setting. Based on the weight detected by the weight determination system, the drive mode selected by the driver may be modified or altered in order to assure that the safest settings are used to operate the vehicle, thus allowing the driver to safely pull the trailer. In certain embodiments, the system may alert the driver to these changes in drive mode settings, and that a custom drive mode has been developed and implemented.

BRIEF DESCRIPTION OF THE DRAWINGS

The following drawings are provided to illustrate certain embodiments described herein. The drawings are merely illustrative, and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIG. 3A is an illustration depicting one scenario demonstrating how the system may be implemented for a specific truck pulling a flatbed trailer.

FIG. 3B shows a cloud network communicating via wireless signal.

FIG. 3C illustrates a mobile app on the mobile device.

FIG. 4 is a perspective view of a vehicle and its fuel delivery system.

DETAILED DESCRIPTION

Figure 1:
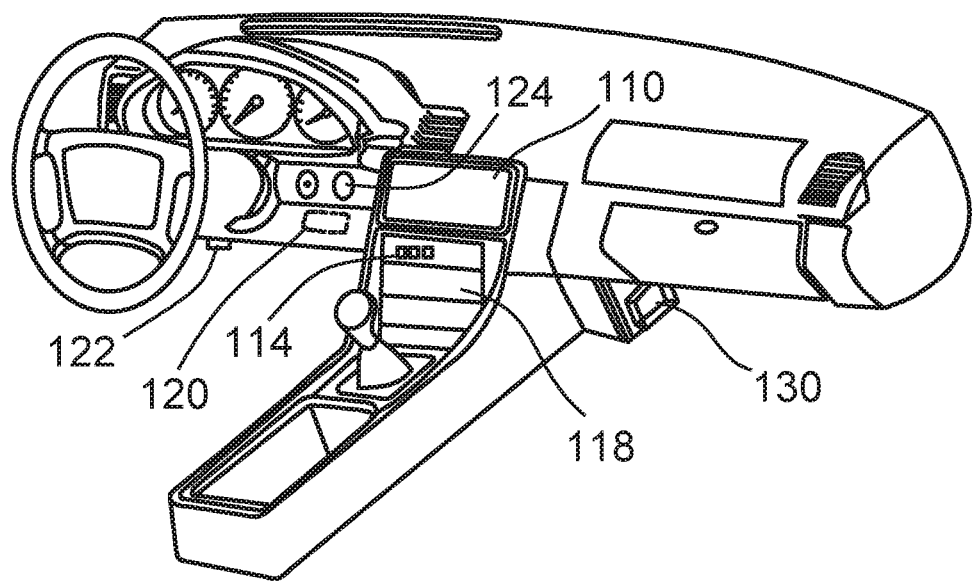
FIG. 1 is an illustration depicting a car dashboard, steering wheel and shifter.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

Operation of the Emissions Control System

Operation of the Automatically Adjusting Vehicle Emissions Control (AAVEC) system may be as follows: A user opens the AAVEC app on a mobile device (or app "on-board" vehicle for OEM implementation) that prompts the user to indicate equipment included in the system. If the equipment included is a trailer, for example, the user is prompted to indicate that the trailer is part of the system and to include the trailer and its weight. In some embodiments, the trailer and its weight are recognized by the AAVEC automatically so that no user interface is required. In other embodiments, the AAVEC is automatically started every time the vehicle is driven and communicates to the vehicle control system the weight of the loads (both loads in the bed of a truck, for example along with the trailer weight). In certain embodiments, the AAVEC includes sensors that recognize when equipment like a trailer is connected to the truck, and starts tracking the weight of the trailer as soon as it is hooked up.

Information regarding weight is communicated in real-time, enabling real-time adjustments to be made to the vehicle systems to accommodate any changes to the load. These adjustments may be made initially when the driver first starts driving the vehicle based on pre-set data, or measured data made prior to a first drive event with load (weight). As the vehicle begins a first drive event, the AAVEC may monitor the weight and make further adjustments to the weight data based on the behavior of the system while towing.

In some embodiments, a custom load profile may be developed by building a profile for each weight or loading characteristic. For example, there may be a load profile called "heavy" for a heavy load in the bed of the truck. There may also be a "trailer" load profile for the truck pulling a trailer. Since each case may require different settings for the emissions control system, engine management system, or other related systems based on the amount of weight or load, a unique load profile may be stored in memory and used in the future for that same application. In this way, the "trailer" load profile may then be engaged every time the trailer is hooked up.

Feedback from adjustments made to various on-board control systems such as emissions control settings based on load for example, may be further detected by the on-board weight determination system in order to further refine and calibrate the settings and load profiles. These profiles are stored in the memory of the AAVEC and used to determine the appropriate settings for subsequent loads. Every time the vehicle is driving on the roadway with a load, on-board sensors including weight detection systems and accelerometers continue to provide data to inform the AAVEC regarding the behavior of the vehicle under the present conditions.

Systems that may influence emissions include systems that control one or more of the: Catalytic Converter, Variable Valve Timing (VVT), Variable Valve Lift (VVL), Variable Camshaft Timing (VCT), Power Management System (PMS), Air Fuel Ratios (AFR), Diesel Particulate Filter (DPF), Selective Catalytic Reduction (SCR), Diesel Exhaust Fluid (DEF), Diesel Particulate Filter (or DPF), Diesel Oxidation Catalyst (DOC), including combinations of one or more of these systems. The AAVEC may inform these systems to achieve the best performance of each of these systems based on the specific load profile. In addition to informing these systems, the AAVEC may also monitor these systems to determine the effect of any and all adjustments made regarding a given load profile. Emissions profiles may be developed based on the response of adjustments made to each of these systems and how these adjustments improve the efficacy of the emissions control systems. In this way, the AAVEC may be "tuned" in order to achieve the ideal settings based on the total weight and loading of the vehicle.

The emissions of an engine will be affected by the ignition timing that is used, in addition to the air/fuel ratio. Oxides of nitrogen increase as ignition timing is advanced. Running light-load advances of 40 or more degrees is common, giving good responsiveness off load, but if emissions standards need to be met, this advance may have to be reduced. On the other hand, the emission of carbon monoxide (CO) is affected very little by ignition timing, being much more influenced by the air/fuel ratio. At stoichiometric and lean air/fuel ratios, increasing the ignition timing can reduce specific fuel consumption substantially. Systems that adjust timing and/or air fuel ratios may be informed by the AAVEC.

In some cases, the AAVEC may inform the user regarding replacement of filters, amount of fluid and type of fluid to add to the DEF tank, scheduled regen cycles of DPF. In certain embodiments, the AAVEC may inform control systems regarding loading that may affect engine timing, preheating of engine and related systems (exhaust, for example), fuel additives, ratios of additives to fuel, fuel/air ratios, tuning (i.e. amount of ammonia flow for SCR), or maintenance schedules related to these systems. In other embodiments, the AAVEC may send control commands to these systems to make adjustments to settings, modify schedules, or enable automated systems to modify actions based on the load profile.

In some embodiments, the AAVEC may also include sensors that measure temperature, humidity, and other conditions of various systems and components that may relate to the extra weight and loading on the engine. Temperature is one of the largest limitations of SCR. Gas turbines, cars, and diesel engines all have a period during a start-up where exhaust temperatures are too cool for NOx reduction to occur. The AAVEC may enable on-board control systems to pre-heat the exhaust, restrict acceleration during the first few minutes of start-up, or inform the driver to drive more slowly at the beginning to allow the exhaust system to warm-up. These may be visual (on a dashboard display for example) or visual alerts.

Since the weight being hauled by the vehicle affects not only the performance of the vehicle and the fuel economy, but also emissions, the load profiles for each set-up (based on weight and haul equipment) may be factory pre-set. In certain embodiments, the user or driver of the vehicle may also modify load profiles. The pre-sets, for example, may accelerate the vehicle more slowly or gradually when under a heavy load. By accelerating more slowly, the combustion is more efficient, reducing particulates to be removed by the emissions control system. The rate and range of these acceleration profiles may be adjusted or modified by the user.

Depending on how much weight a truck is carrying and work an engine is putting in, you might see the gasoline-to-diesel ratio vary from 85:15 to 50:50. These ratios may be monitored and controlled by the AAVEC in order to maintain the ideal ratio for a given load profile.

In certain embodiments, the AAVEC may be implemented directly into the vehicle in a factory or OEM application. In other embodiments, the AAVEC may be retrofitted to an existing vehicle. In a retrofit application, the AAVEC may plug into the vehicle's OBD port to allow interface with the vehicle's control system. Alternatively, it may be connected wirelessly either via a wireless adapter to the OBD, or to other wireless interface devices that connect the AAVEC to the vehicle's control systems.

The AAVEC may also interface with autonomous or semi-autonomous vehicles, informing the control system regarding weight and the impact that weight has on the engine and emissions system.

In certain embodiments, the AAVEC may be implemented via a local network. The local network may comprise the engine, emissions system and all associated control systems that affect emissions. The AAVEC may communicate weight and engine loading data to each of these systems. In certain embodiments, the AAVEC may develop performance profiles based on adjustments made based on weight and engine loading. The AAVEC may further monitor the performance of these systems based on the performance profile in order to calibrate and refine the settings.

In other embodiments, the AAVEC may further comprise connection to a cloud network. For example, user profiles, drive mode profiles, vehicle profiles, and system settings may be stored and accessed via a connection to the cloud. This connection may be via wireless devices or transmitter and receivers. In some embodiments, both monitoring and control of the AAVEC may also be done via the cloud.

A mobile device may also be used for a user interface with the AAVEC. In some cases, the processor in a mobile device along with other AAVEC components may be comprised within the mobile device, and the mobile device may interface with the vehicle via a wireless connection. The mobile device may allow for user data or changes to the factory presets to be entered in.

In another embodiment, the user interface with the AAVEC may be via the vehicle's infotainment system or other interface device on the dashboard of the vehicle.

FIG. 1A is an illustration depicting a car dashboard, steering wheel and shifter. The system 120 for automatically adjusting drive modes based on weight is shown behind the dashboard near the steering wheel. In some embodiments, the system is an OEM product incorporated into the vehicle at the time of manufacture. In other embodiments, the system may be connected to the vehicle via the OBD port 122 as an after-market component. In one embodiment, the OBD connector may have a wireless connection to the system. In another embodiment, the system may be plugged into the OBD port with a wired connector.

In another embodiment, an after-market wireless device 130 may be attached to the vehicle. The vehicle may have a tow/haul button 124 on the dash of the vehicle. Other user interface devices may include an infotainment system 118, vehicle control system user interface buttons 114, or drive mode selection panel 110. The purpose of these interface devices is to provide one or more methods for the user or driver to input drive mode settings, or to make adjustments to drive modes. The interface devices also provide a way for the system to communicate drive modes and to alert the driver to changes in the drive mode or additional conditions detected by the system that require user intervention.

For example, the driver or user may push a button on the dash for "tow/haul", knowing that they are pulling a trailer. The system may then determine the best drive mode for towing a load. The system may further adjust various system settings as needed to accommodate this added load. The braking system may be adjusted to apply more pressure to the brakes as required for the added load. The brake gain signal to the trailer may also be adjusted to match requirements for that specific trailer load. In some cases, the trailer load may be significantly higher than the tow vehicle load and may require more braking pressure than the tow vehicle. In this scenario, since the weights of both the tow vehicle and trailer are known by the on-board weight determination system, the system may then inform the braking system to apply the necessary braking to each of the brake components. In certain embodiments, sensor data may indicate different tire air pressure for each wheel and associated brake for that wheel. In order to improve safety in handling, the system may select a different braking setting for the wheel associated with the low air pressure tire. The system may further alert the driver to this occurrence along with how the drive mode was adjusted to compensate.

Figure 2:
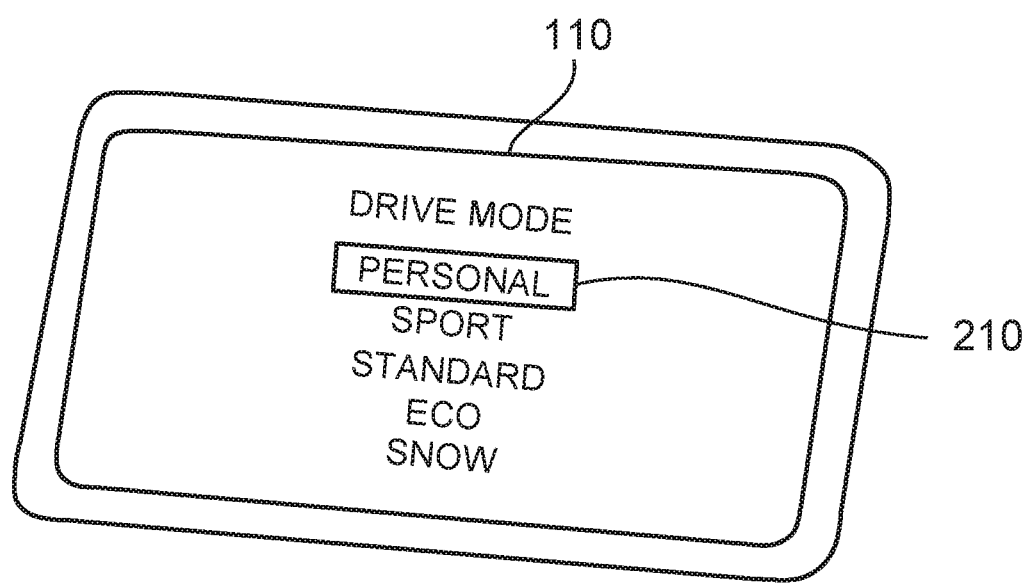
FIG. 2 is an illustration of the drive mode selection panel with several drive mode selections indicated.

FIG. 2 is an illustration of the drive mode selection panel 110 with several drive mode selections indicated. The driver may select the "personal" drive mode 210 for example. This may be a custom setting determined by the user and entered into the system as a custom drive mode setting. Factory preset and custom drive mode settings may be displayed on the drive mode selection panel 110.

FIG. 3A is an illustration depicting one scenario demonstrating how the system may be implemented for a specific truck pulling a flatbed trailer. Truck 310 is shown hauling flatbed trailer 316. Trailer type and weight may be communicated by wireless device 312, and load 318 may be communicated to the system 120 via trailer wireless signal 303. Tongue weight may be determined by sensor 324 and communicated via wireless signal 305. Axle weight may be determined by sensor 314 and communicated via signal 307.

FIG. 3B shows a cloud 330 network communicating via wireless signal 309. The cloud may communicate to the system to store drive mode settings as a back-up for any memory loss to the vehicle mounted system components. System components may be redundantly included in the cloud, on the vehicle system component and on a mobile device. In this way, various system components that may be damaged or otherwise rendered inactive for any reason may be backed up by these redundant system components. For example, if a vehicle's computer or control system is damaged, a complete copy of all settings may be re-installed into a new replacement computer or control system. All relevant data and information including modeling for each set-up are communicated to the cloud 330. All settings, manufacturers ratings, set-ups and user input data may be stored in the cloud. In some embodiments, set-up information may be retained in the cloud and downloaded to the system after a system failure, or data loss.

FIG. 3C illustrates a mobile app on the mobile device 340 shown. In this embodiment, the system is on the mobile device and all interface between the tow vehicle and trailer is done wirelessly via signal 340.

FIG. 4 is a perspective view of a vehicle and its fuel delivery system. System 120 may be accessed by the user selecting "economy" drive mode via selection button 430 on infotainment system 118 in one embodiment of the system. In this example, The selection of fuel from either gasoline tank 420 or natural gas tank 440 may be made by the system 120 to provide the most fuel efficient operation of the vehicle. In some embodiments, a mixture of two fuels may be desired for a selected drive mode. The system may inform the ratio of the fuel mixture through adjusting mixing valve 412. Further adjustments to the fuel delivery may be made at the fuel injectors 410 by the system adjusting fuel-air mixture. These adjustments may be made via the energy control unit (ECU) 416. Fuel injector controller 414 may also be informed by the system 120 directly or via ECU 416.

Figure 5:
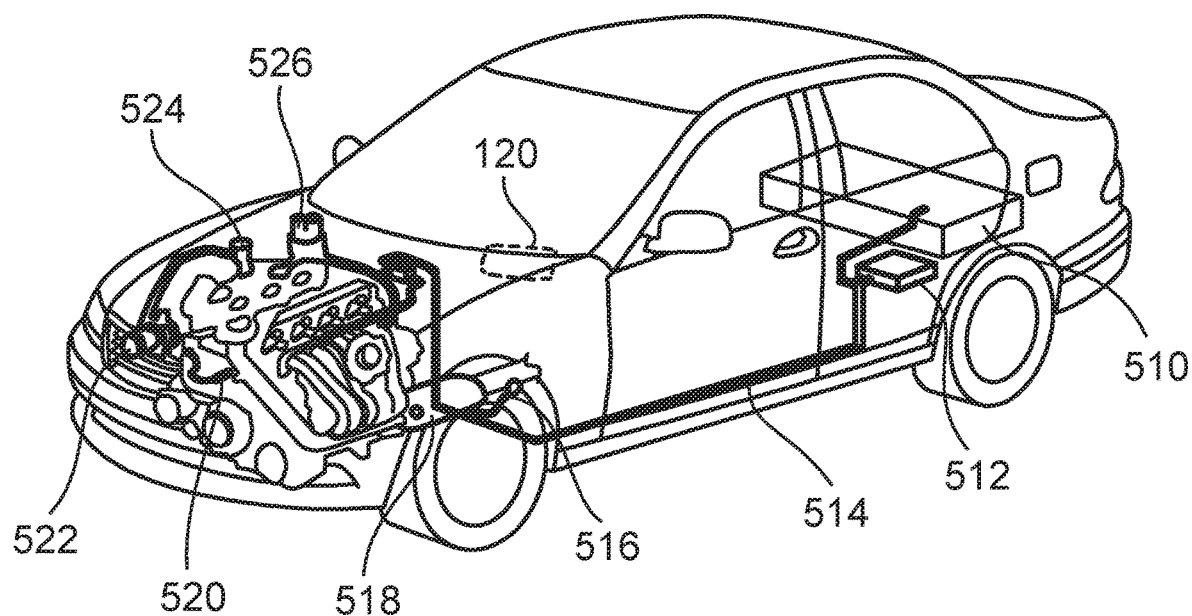
FIG. 5 is a perspective view of a vehicle and its electrical signaling system.

FIG. 5 is a perspective view of a vehicle and its electrical signaling system. System 120 may be integrated into the vehicle via signal wiring 514 at the time of manufacture. Fuel tank 510 may have fuel delivery controlled via fuel controller 512 via signal control wiring 514. Exhaust system 518 may have sensor 516 detecting emissions of the vehicle and communicating emissions data to system 120. Distributor 526, temperature sensor 524, speed sensor 522 and torque sensor 520 may communicate data to the system 120.

Figure 6:
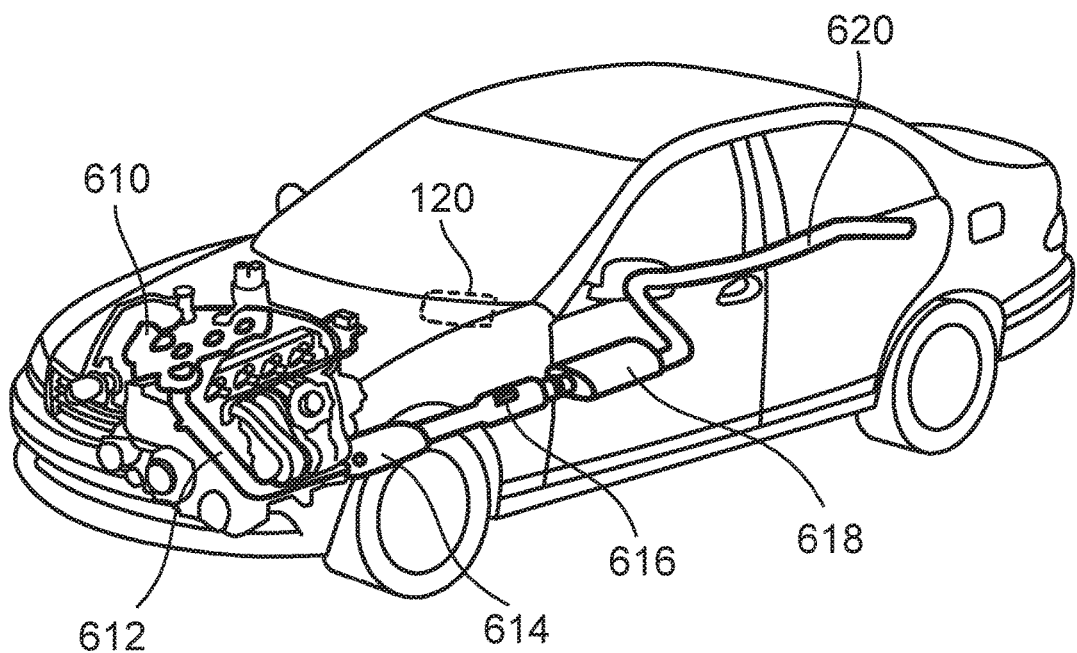
FIG. 6 is a perspective view of a vehicle and its exhaust system.

FIG. 6 is a perspective view of a vehicle and its exhaust system. Muffler 618 and tail pipe 620 are shown. Sensor 616 in the exhaust system may communicate emissions data to system 120. Emissions control system 614 settings may be adjusted by the system 120. Additional sensors may also be located in downpipe 612 or headers 610. In some embodiments, adjustments to the exhaust airflow through the exhaust system may be made by the system according to the drive mode settings for a specific trip or weight being hauled.

The emissions control system 614 may control one or more of the: Catalytic Converter, Variable Valve Timing (VVT), Variable Valve Lift (VVL), Variable Camshaft Timing (VCT), Power Management System (PMS), Air Fuel Ratios (AFR), Diesel Particulate Filter (DPF), Selective Catalytic Reduction (SCR), Diesel Exhaust Fluid (DEF), Diesel Particulate Filter (or DPF), Diesel Oxidation Catalyst (DOC), including combinations of one or more of these systems. The system 120 may inform the emissions control system 614 according to the drive mode selected in order to achieve the best performance of each of these systems based on the specific load profile. In addition to informing these systems, the system 120 may also monitor these systems to determine the effect of any and all adjustments made regarding a given load profile. Emissions profiles may be developed based on the response of adjustments made to each of these systems and how these adjustments improve the efficacy of the emissions control systems. In this way, the model for each specific drive mode may be "tuned" in order to achieve the ideal settings based on the total weight and loading of the vehicle.

Figure 7:
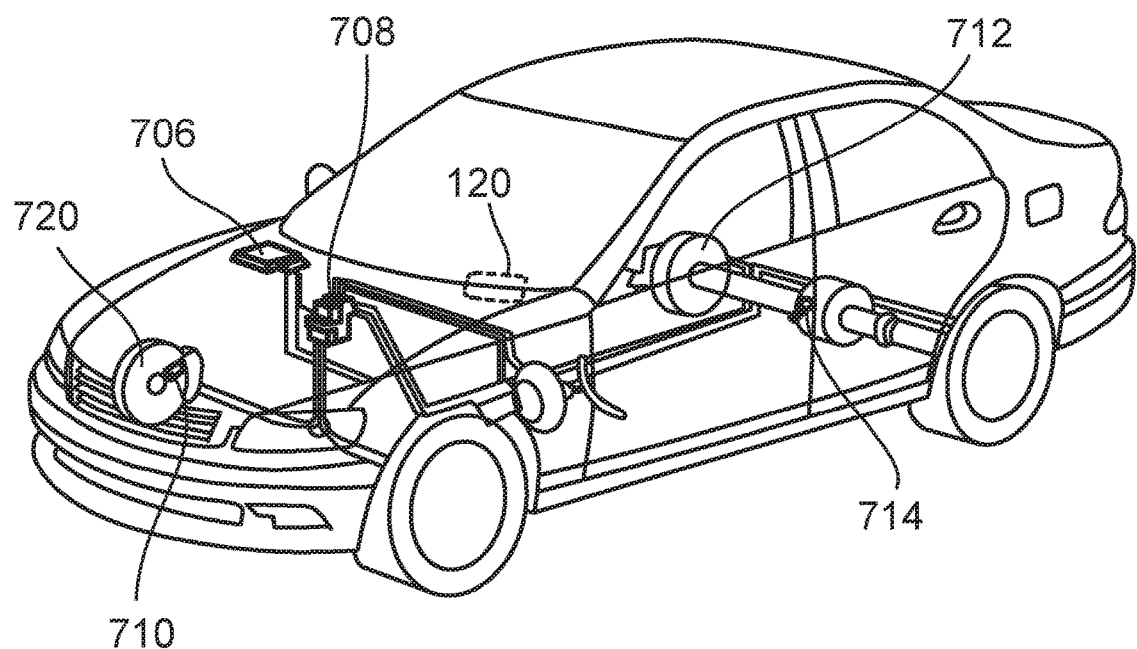
FIG. 7 is a perspective view of a vehicle and its braking system.

FIG. 7 is a perspective view of a vehicle and its braking system. Front disc brakes 720 may have a sensor 710 communicating brake temperature or other braking data to system 120. The system 120 may communicate brake settings associated with selected drive mode to brake control system 706 which sends control commands to brake distribution unit 708. Unit 708 delivers the required force to each of the brakes as required by the brake control system 706 to meet the requirements of the selected drive mode. Sensor 714 may communicate rear transaxle data to the system 120. Braking force to rear brakes 712 may also be controlled by unit 708.

Figure 8:
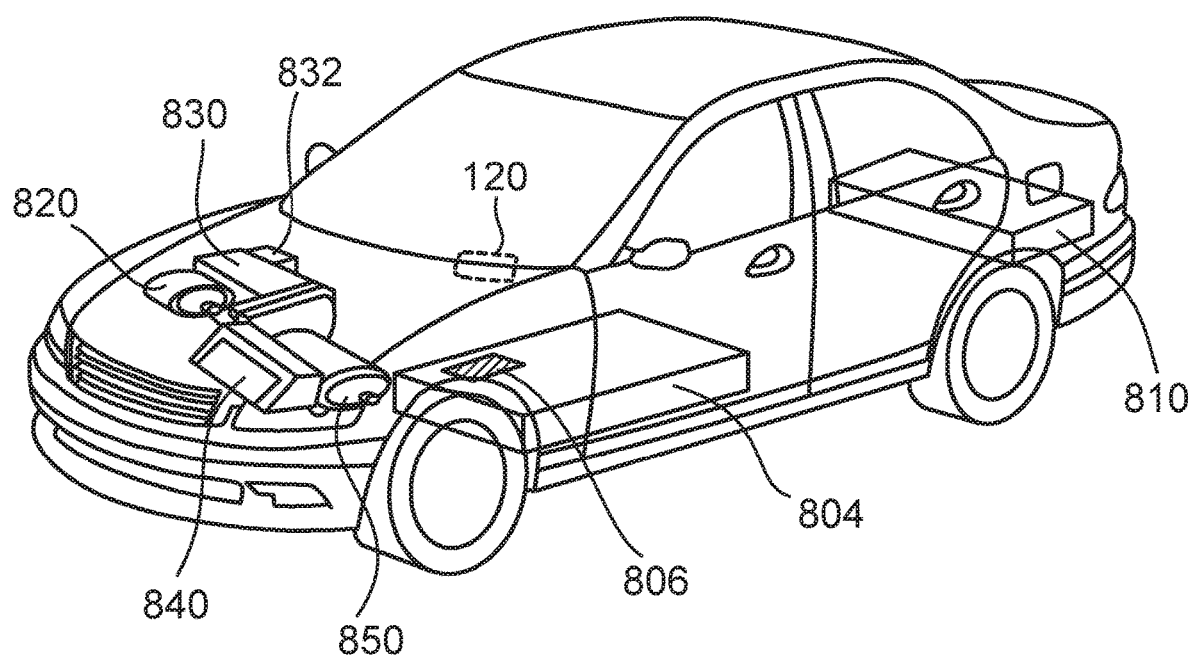
FIG. 8 is a perspective view of a hybrid vehicle.

FIG. 8 is a perspective view of a hybrid vehicle. Hybrid energy management system 840 determines how much energy is delivered to the electric motor 850 and gas engine 830 based on commands from the system 120 for the selected drive mode. Fuel delivered to the engine from fuel tank 810 is controlled by the system 120 according to the drive mode setting. Battery bank 804 delivers power to electric motor 850 via battery system controller 806. Controller 806 may receive control commands from system 120 based on drive mode settings. Engine control unit 832 may also receive control commands from the system 120. The engine control unit 832 may determine how much energy may be delivered to the gas engine and how much be delivered to the electric motor based on the weight of the vehicle and its loads. Transmission 840 delivers mechanical power to the vehicle.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A system for automatically adjusting drive modes based on weight, comprising:
   a weight determination system;
   a data input device configured to receive input data;
   a processing device comprising a processor and non-volatile memory;
   wherein the processor is configured to:
   receive weight data from the weight determination system;
   receive the input data from the data input device;
   receive a user input;
   determine at least one drive mode setting based on the weight data, the input data and the user input;
   send the drive mode setting data to a vehicle control system;
   determine a load profile for a specific set-up based on weight and haul equipment;

make adjustments to the vehicle control system in real-time based on the drive mode setting data;
receive feedback from the adjustments;
refine and calibrate at least one modified drive mode setting and at least one modified load profile based on the adjustments;
send the modified drive mode setting to a vehicle control system; and
communicate the modified drive mode setting to a user.

2. The system of claim 1, wherein the weight data comprises vehicle weight.

3. The system of claim 2, wherein the weight data further comprises trailer weight.

4. The system of claim 1, wherein the input device further comprises:
one or more sensors; wherein the one or more sensors produce sensor data.

5. The system of claim 1, wherein the input data comprises emissions data.

6. The system of claim 5, wherein the system sends at least one command to the vehicle control system to adjust engine settings related to emissions.

7. The system of claim 5, wherein the system sends at least one command to the vehicle control system to adjust vehicle exhaust and emissions systems.

8. The system of claim 1, wherein the system sends at least one command to the vehicle control system to adjust fuel delivery settings.

9. The system of claim 1, wherein the system sends at least one control command to a hybrid vehicle power management system, controlling the flow of energy to an electric motor and power to an internal combustion engine.

10. The system of claim 1, wherein the system sends at least one control command to a vehicle braking system, controlling braking force delivered to brakes.

11. The system of claim 1, wherein the input device is an On-Board Diagnostics device connected by a plug-in connector to a vehicle On-Board Diagnostics port.

12. The system of claim 1, wherein the system sends at least one control command to a vehicle computer server.

13. The system of claim 1, wherein the input device receives and transmits data via a wireless interface.

14. The system of claim 4, wherein the processor is configured to build a model of a set-up for a specific vehicle connected to a specific trailer;
wherein the model determines at least one drive mode based on the data associated with the set-up for the model;
wherein the model is stored in the non-volatile memory;
wherein the system communicates the drive mode for the model to the vehicle control system; and
wherein the system alerts the user to the drive mode for the model.

15. The system of claim 14, wherein the non-volatile memory stores factory settings and user settings specific to the model.

16. The system of claim 14, wherein the system further comprises a cloud-based network;
wherein factory settings, the user settings and the sensor data are stored in the memory of the cloud-based network;
wherein the cloud-based network processor is configured to:
determine set-up specific drive mode settings for a specific towing set-up of tow vehicle, trailer and all associated tow equipment; and
transmit the set-up specific drive mode settings to the system based on the sensor data, the factory settings, and the user settings.

17. The system of claim 1, wherein the data input device comprises a cell phone, satellite phone, smartphone, personal digital assistant, tablet computer, laptop computer, remote control device, mobile transmitter, a mobile internet device or a combination of one or more of the same.

18. The system of claim 4, wherein the sensors convert sensor data to an electrical signal; and wherein the sensors comprise at least one of: electromagnetic; electrochemical; electric current; electric potential; magnetic; radio; air flow; accelerometers; pressure; electro-acoustic; electro-optical; photoelectric; electrostatic; thermoelectric; radio-acoustic; environmental; moisture; humidity; fluid velocity; position; angle; displacement; or combinations thereof.

19. The system of claim 14, wherein the system further:
monitors, via the sensors, behavior of a vehicle and its components while driving on a specific trip;
makes adjustments to the drive mode and the model for the specific trip based on the specific trip sensor data and input data; and
stores, in the non-volatile memory, an adjusted drive mode model based on the adjustments.

* * * * *